United States Patent
Torimoto et al.

(10) Patent No.: US 7,880,752 B2
(45) Date of Patent: Feb. 1, 2011

(54) METHOD AND APPARATUS FOR PROPORTIONALLY ADJUSTING THE SIZE OF IMAGES TRANSMITTED BETWEEN MOBILE COMMUNICATIONS TERMINALS

(75) Inventors: Naomi Torimoto, Tokyo (JP); Kyoko Inoue, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 452 days.

(21) Appl. No.: 11/013,225

(22) Filed: Dec. 14, 2004

(65) Prior Publication Data

US 2005/0134693 A1 Jun. 23, 2005

(30) Foreign Application Priority Data

Dec. 17, 2003 (JP) .............................. 2003-420215
Aug. 11, 2004 (JP) .............................. 2004-234728

(51) Int. Cl.
*G09G 5/391* (2006.01)
*G06T 3/40* (2006.01)
(52) U.S. Cl. .......................... 345/667; 345/2.3; 345/670
(58) Field of Classification Search ................ 345/660, 345/667–671, 698, 2.3; 715/519, 238
See application file for complete search history.

(56) References Cited

U.S. PATENT DOCUMENTS

| | | | |
|---|---|---|---|
| 6,345,279 B1 * | 2/2002 | Li et al. ................... 707/104.1 |
| 6,684,087 B1 * | 1/2004 | Yu et al. ..................... 455/566 |
| 6,965,388 B2 * | 11/2005 | Vale et al. ................... 345/660 |
| 2003/0014445 A1 | 1/2003 | Formanek et al. |
| 2003/0041102 A1 * | 2/2003 | Simpson et al. ............. 709/203 |
| 2003/0197784 A1 | 10/2003 | Bae |
| 2004/0075671 A1 * | 4/2004 | Vale et al. ................... 345/660 |
| 2004/0075673 A1 * | 4/2004 | Vale et al. ................... 345/660 |

FOREIGN PATENT DOCUMENTS

| JP | H10-326169 | 12/1998 |
|---|---|---|
| JP | 11-122398 A | 4/1999 |
| WO | WO 02/43365 A | 5/2002 |

OTHER PUBLICATIONS

Takao Shimada, Naoko Iwami, Takewo Tomokane, Mitsuo Hayashi and Yasuyuki Kuwahara, Interactive scaling control mechanism for World-Wide Web systems, Sep. 1997, Computer Networks and ISDN Systems, Papers from the Sixth International World Wide Web Conference, vol. 29, Issues 8-13, pp. 1467-1477.*

(Continued)

*Primary Examiner*—Jeffery A Brier
(74) *Attorney, Agent, or Firm*—Michaud-Kinney Group LLP (57) ABSTRACT

A plurality of image data attached to electronic mail data is stored in a memory. A control unit identifies an image having the largest width, from among images drawn by each image data. The control unit then computes a contraction scale to be used for fitting the largest image to a display area of its own display unit, and applies the contraction process to data of each of image stored in memory using the computed contraction scale. Thus contracted image data are then displayed on the display unit.

20 Claims, 9 Drawing Sheets

OTHER PUBLICATIONS

Bill N. Schilit, Jonathan Trevor, David M. Hilbert and Tzu Khiau Koh, Web Interaction Using Very Small Internet Devices, Oct. 2002, IEEE Computer, vol. 35, Issue: 10, pp. 37-45.*

Bickmore et al. "Web Page Filtering and Re-authorizing for Mobile Users", The Computer Journal, vol. 42, No. 6, Apr. 21, 1999, USA.

European Search Report dated Apr. 23, 2007 for Application No. 04027744.4-1522.

Application No. 04 027 744.4-1522, Office Action, date mailed Nov. 8, 2009.

* cited by examiner

METHOD AND APPARATUS FOR PROPORTIONALLY ADJUSTING THE SIZE OF IMAGES TRANSMITTED BETWEEN MOBILE COMMUNICATIONS TERMINALS

CROSS-REFERENCE TO RELATED APPLICATIONS

This application is entitled to the benefit of and incorporates by reference essential subject matter disclosed in Japanese Patent Application No. 2003-420215 filed on Dec. 17, 2003 and Japanese Patent Application No. 2004-234728 filed on Aug. 11, 2004.

TECHNICAL FIELD

The present invention relates to an image adjustment mechanism and a related mobile communications terminal.

BACKGROUND ART

Electronic mail with attached image data is commonly exchanged between users of mobile communications terminals. Usually, a mobile communications terminal used for receiving electronic mail is capable of receiving from another mobile communications terminal an electronic mail containing an image file associated with a predetermined tag, interpreting the tag associated with the image file, and thereby displaying on its display unit a screen showing the nicely laid out text and image contained in the electronic mail.

Such a mobile communications terminal is often provided further with a function for automatically correcting the size of an image represented in the received image data so as to fit the image size to the display width of its display unit, so as to allow for differences in sizes of display units. A user of a mobile communications terminal having such a function is able to view details of an electronic mail without being aware of a difference in display size, even in a case where an electronic mail is received with an image data created using a display having a different resolution.

Figure 10:
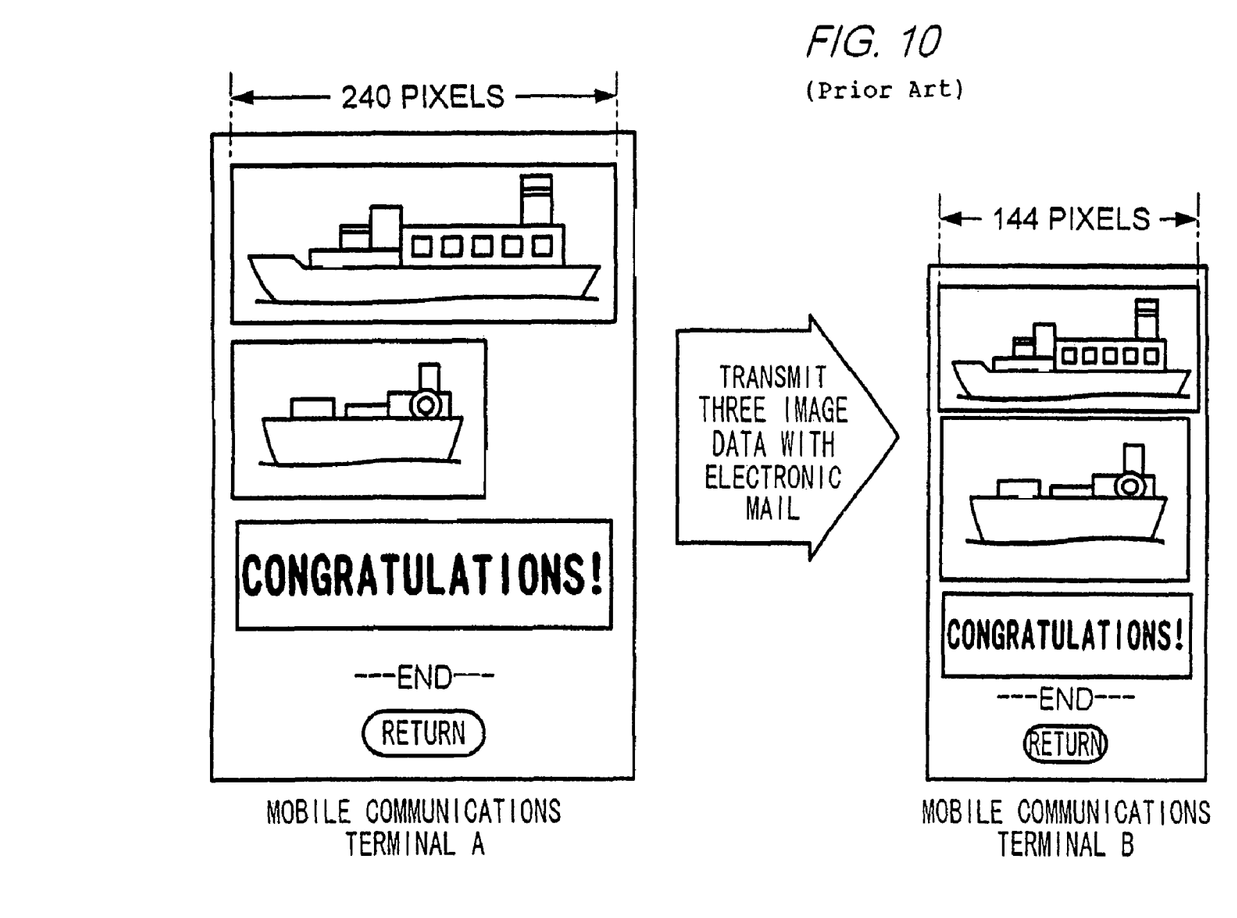
FIG. 10 is a diagram showing an example of a conventional image scale contraction process known in the prior art.

When an electronic mail has data of more than one image attached, a mobile communications terminal receiving the data computes a contraction scale independently for each image and reduces the scale of each image according to the independently computed contraction scale, so that each image may fit in accordance with the breadth of the display area of the mobile communications terminal. However, when a scale contraction process is applied according to such a conventional method, contraction scales may be different for each image, as they are computed independently depending on the size of each image, and therefore, the proportion between different images that existed at a source terminal is compromised. In an example shown in FIG. 10, data of three images are generated in a mobile communications terminal A having a display area of 240 pixels in width, and an electronic mail, together with the data of the three images, is transmitted to a mobile communications terminal B provided with a display area of only 144 pixels in width. Of the three images shown in FIG. 10, the image showing a large boat, and the image showing "Congratulations!" have to be scaled down, since they do not fit into the display area of 144 pixels, whereas the image showing a small boat is displayed in an unchanged scale because it fits into the display area of 144 pixels in width. As a consequence, the original picture, showing a large boat on the upper line and a small boat below it, is most unlikely to be understood by a receiver of the electronic mail.

Based on the foregoing, it is the general object of the present invention to provide a method and apparatus for proportionally adjusting the size of images transmitted between mobile communications terminals that improves upon or overcomes the problems associated with the prior art.

SUMMARY OF INVENTION

The present invention has been envisioned to solve the above stated problems, and its object is to provide an image adjustment device capable of displaying, when an electronic mail is received with an attachment of data of more than one image, all image data while maintaining the proportion of the different images to each other and also displaying each image in its entirety.

To achieve this object, the present invention provides in one aspect a means of proportionally adjusting, at a receiver mobile communications terminal of an electronic mail or transmitted data, the size of more than one image received with the electronic mail, so that each image can be displayed, together with the text of the transmitted data, in a display area of the receiving mobile communications terminal while the original proportion of the images relative to each other is maintained. Specifically, the present invention provides an image adjustment device comprising a means for identifying an image having the largest horizontal width from among more than one image received in the transmitted data, a means proportionally adjusting the image scale such that the largest width identified in the images can be displayed on the display area of the receiving mobile communications terminal, a means of identifying an aspect ratio of each image, and a means of changing a size of each image according to the computed scale while maintaining the identified aspect ratio such that the images in enlarged or contracted size are displayed on the display area.

The present invention further provides a means of enabling a receiving mobile communications terminal of transmitted data to display an image or images having a size created at an originating or transmitting mobile communications terminal by making the best use of its own display area, without being affected by any image adjustment process performed at an intermediate terminal.

The present invention resides in another aspect in a server for manipulating data received from a mobile communications terminal. The server includes memory means for storing data corresponding to characteristics defined by a plurality of receiving mobile communications terminals. These characteristics preferably include the display sizes associated with each of the plurality of receiving mobile communications terminals. The server further includes receiving means for accepting transmitted data from a transmitting mobile communications terminal, the transmitted data containing image data corresponding to at least two images. Analyzing means are also provided for identifying a receiving mobile communications terminal and a display size associated therewith. The analyzing means further includes comparing means for reviewing the transmitted data against the display size defined by the receiving mobile communications terminal to determine if proportional image resizing is needed. If it is found that proportional image resizing is necessary, the analyzing means proportionally resizes the at least two images for viewing on the display defined by the receiving mobile communications terminal thereby creating modified transmitted data. The server also includes transmitting means for forwarding the transmitted data or the modified transmitted data from the server to the receiving mobile communications terminal.

In an embodiment of the present invention the transmitted data received from the transmitting mobile communications terminal includes image information that identifies the image having the largest horizontal width defined by the at least two images contained within the transmitted data. The above-described analyzing means compares this image information with the display size defined by the receiving mobile communications terminal and if necessary, applies a scaling factor to the transmitted data. The transmitting means then forwards the transmitted data with the scaling factor applied thereto to the receiving mobile communications terminal.

According to the present invention, the proportion of the size between different images contained in an electronic mail is maintained, such that the intention of a user of an originating terminal is properly conveyed to a user of a receiving terminal.

DETAILED DESCRIPTION OF THE PREFERRED EMBODIMENT

First Embodiment

In the following, description will be given of an electronic mail system according to a first embodiment, wherein an electronic mail, having data of more than one image attached, is exchanged among mobile communications terminal having display areas of different sizes. A terminal which has received the electronic mail is able to display the received images, after reducing the size thereof, while maintaining the original proportion of the images.

It is to be noted that "electronic mail data" is used in description of the present embodiment to mean text data corresponding to, at least two images, as well as control data for the mail.

Figure 1:
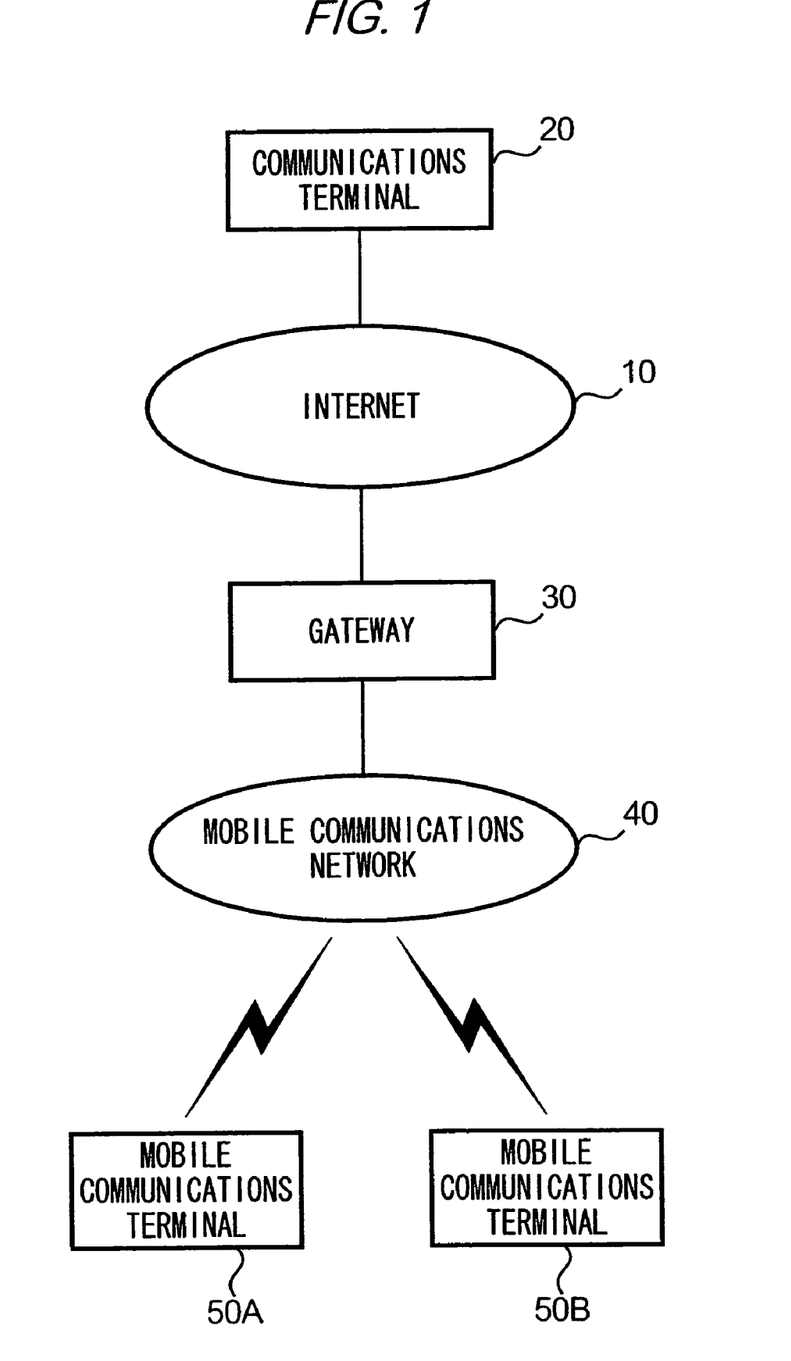
FIG. 1 is an overall configuration of an embodiment.

FIG. 1 is a diagram showing an overall configuration of an electronic mail system according to the present invention. As shown in the figure, the system comprises a communications terminal 20 connected to the Internet 10, a mobile communication network 40 connected to the Internet 10 via a gateway (hereinafter referred to as "GW") 30, and mobile communications terminals 50A, 50B served by mobile communication network 40. Communications terminal 20 is, for example, a personal computer (hereinafter referred to as "PC"), and is capable of displaying electronic mail data received via the Internet 10 after performing a layout process of text data and image data contained therein. Communications terminal 20 can also be used to create an image using a well-known drawing software application program, and of transmitting electronic mail data containing images to another node.

GW 30 has a function of converting a communication protocol used in the Internet 10 to a protocol used in mobile communication network 40, and vice versa. By this function, GW 30 relays communications between communications terminal 20 and an electronic mail server connected to the Internet 10, which communication is performed via mobile communication network 40 and the Internet 10.

Mobile communication network 40 comprises a plurality of base stations (not shown) and switching stations (not shown), and serves mobile communications terminals 50A and 50B, thereby providing a wireless communication service to the terminals.

In the illustrated embodiment, mobile communications terminals 50A and 50B are portable phones. In the following, mobile communications terminals 50A and 50B will be collectively referred to as mobile communications terminal 50 except where it is necessary to specify otherwise.

Figure 2:
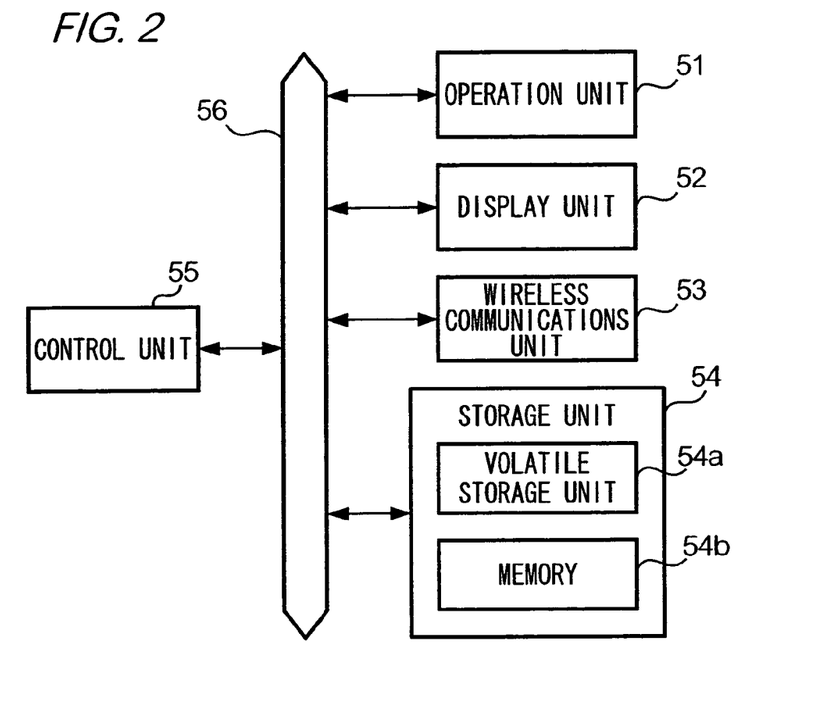
FIG. 2 is a block diagram showing a hardware configuration of a mobile communications terminal.

FIG. 2 is a block diagram showing a hardware configuration of mobile communications terminal 50. As shown in the figure, mobile communications terminal 50 comprises an operation unit 51, a display unit 52, a wireless communications unit 53, a storage unit 54, a control unit 55, and a bus 56 which interconnects the above units.

Operation unit 51 has a plurality of operation keys for enabling a user to perform various input operations, and it transfers, to control unit 55, data corresponding to a received operation input. Display unit 52 comprises a liquid crystal display and a driving circuit therefor, and displays images corresponding to data that has been transferred from control unit 55. A display area size of display unit 52 varies depending on type of a mobile communications terminal 50. For convenience, it is assumed hereinafter that display unit 52 of mobile communications terminal 50A has a display area of 240 pixels in width, and that of mobile communications terminal 50B has a display area of 144 pixels in width. Wireless communications unit 53 receives data transmitted from a base station (not shown) in mobile communications network 40 and passes the received data to control unit 55, and transmits data passed from control unit 55 to the base station.

Storage unit 54 comprises a volatile storage unit 54a having a RAM (Random Access Memory) and the like, a memory 54b having a ROM (Read Only Memory), an EEPROM (Electrically Erasable and Programmable ROM) and the like.

Volatile storage unit 54a is used as a work area for control unit 55. In memory 54b are stored various application programs such as operating system (OS) software for causing control unit 55 to execute an OS; communications application programs for calling another mobile communications terminal 50, receiving calls from another mobile communications terminal 50, and performing voice data exchanges with another terminal; a mailer application program for exchanging electronic data with another mobile communications terminal 50 or a communications terminal 20; a drawing application program for generating image data to be attached to an electronic mail; a browser application for obtaining and displaying data stored at a particular URL (Uniform Resource Locator). Memory 54b also has an area for storing electronic mail data received from another mobile communications terminal 50 or a communications terminal 20.

Figure 3:
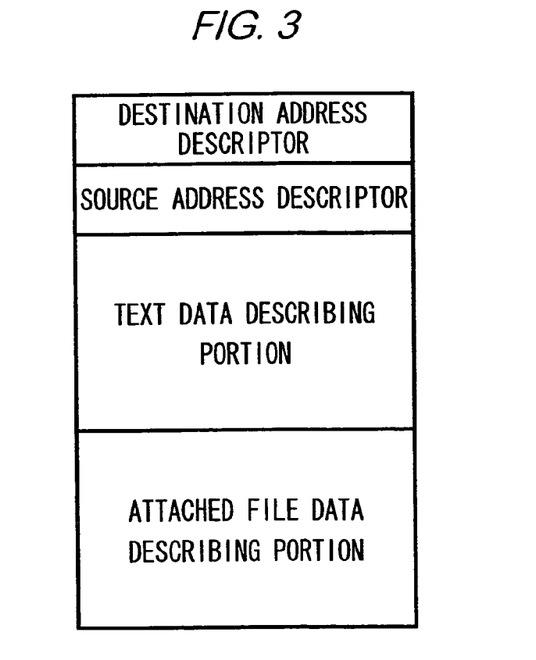
FIG. 3 is a diagram showing a data structure of an electronic mail data.

A typical example of data structure of the electronic mail data is shown in FIG. 3. As shown in the figure, the electronic mail data comprises a destination address descriptor, a source address descriptor, a text data describing portion, and attached file data describing portion. The destination address descriptor and the source address descriptor correspond to a so called header. In the text data describing portion, text data constituting the text of an electronic mail is described, where each sentence of the text is associated with an HTML (hyper-text markup language) tag. The HTML tag for each sentence is also associated with information specifying attributes such as size or color of the characters. Control unit 55 of a terminal which has received an electronic mail determines a size and a color of the characters for each sentence by interpreting those attributes. In the text data describing unit, there is further described an HTML tag that has associated one or a plurality of image data attached to an electronic mail. The attached file data describing portion has stored data of one or a plurality of images attached to an electronic mail, where each of the one or plurality of images is described using, for example, a GIF (Graphic Interchange Format) format, and contains control information of pixels constituting bit map as well as attribute data designating the height and the width of an image, which also correspond to an aspect ratio of image data set at the transmitter terminal.

Memory 54b also has stored an image adjustment application that functions as a plug-in to the above mailer application. Mobile communications terminal 50 implements the mailer application and the image adjustment application together, the resulting function being particular to the present embodiment.

Control unit 55 is for example a CPU (Central Processing Unit), and controls an operation of the terminal 50 by reading and implementing one by one various programs stored in memory 54b. When mobile communications terminal 50 is turned on, control unit 55 reads and executes the OS software from memory 54b. Control unit 55 which is run under the OS software is imparted a function of implementing another software application according to a user's instruction input from operation unit 51. For example, when an operation instruction is input to display an electronic mail received from another mobile communications terminal 50, control unit 55 reads and executes, from memory 54b, the mailer application together with the image adjustment application that functions as a plug-in to the mailer application.

Next, description will be given of an image adjustment process particular to the present embodiment.

The process is performed by control unit 55 by executing the above mailer application and the image adjustment application programs.

In this example, it is assumed that memory 54b of mobile communications terminal 50 has stored data of at least one electronic mail that has been received from another mobile communications terminal 50 or from a communications terminal 20 before the process according to the present embodiment is started.

Figure 4:
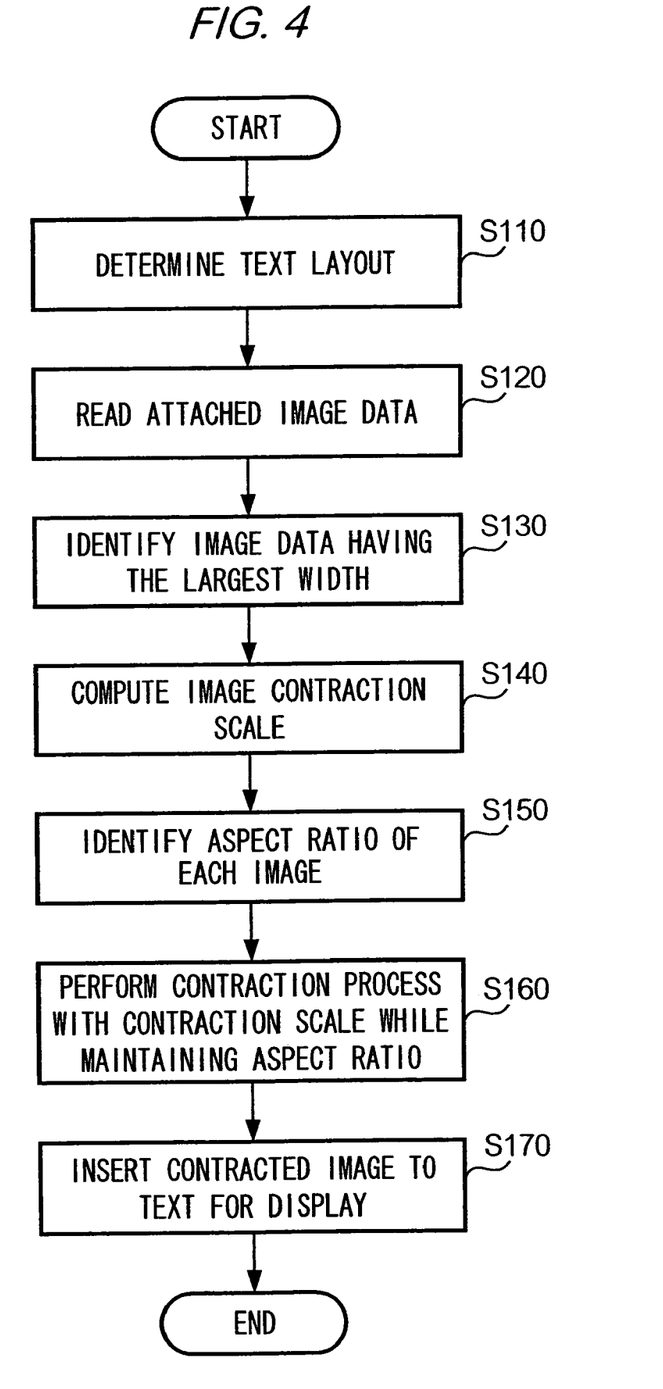
FIG. 4 is a flowchart showing an operation of a first embodiment.

FIG. 4 is a flow chart showing an image adjustment process executed by control unit 55 of mobile communications terminal 50B. When an instruction is input to display an electronic mail, control unit 55 of mobile communications terminal 50B identifies data of the electronic mail to be displayed from memory 54b and determines the text layout such as font and color of characters used in sentences constituting the text, by interpreting the details of the text data describing portion (Step S110). Control unit 55 further interprets the text data describing portion, to thereby identify image data attached to the mail and read the identified image data from memory 54b (Step S120). All image data is read when data of more than one image is attached. Control unit 55 refers to attribute data contained in the data of each of the read images, so as to identify data of the widest image (Step S130).

Control unit 55 computes an image contraction scale to be used for proportionally fitting the image data identified in Step S120 to a display area of display unit 52 (Step S140). For example, when the image width is twice as large as the width of the display area, the contraction scale is computed as 50% and is applied to all image data.

Control unit 55 identifies an aspect ratio of data of each image read from memory 54b, where the aspect ratio is the ratio of the horizontal width to the vertical width of each image (Step S150).

Next, control unit 55 performs a contraction process, according to the contraction scale computed based on the image having the largest size, of data of each image read from memory 54b while maintaining the aspect ratio (Step 160). That is, all of the images are proportionally contracted using the same contraction scale.

Control unit 55 then inserts each image formed from the contracted image data into a predetermined location of the above laid out text in Step S110, so as to display the text with the image on display unit 52 (Step S170). Thus, the routine is completed.

Figure 5:
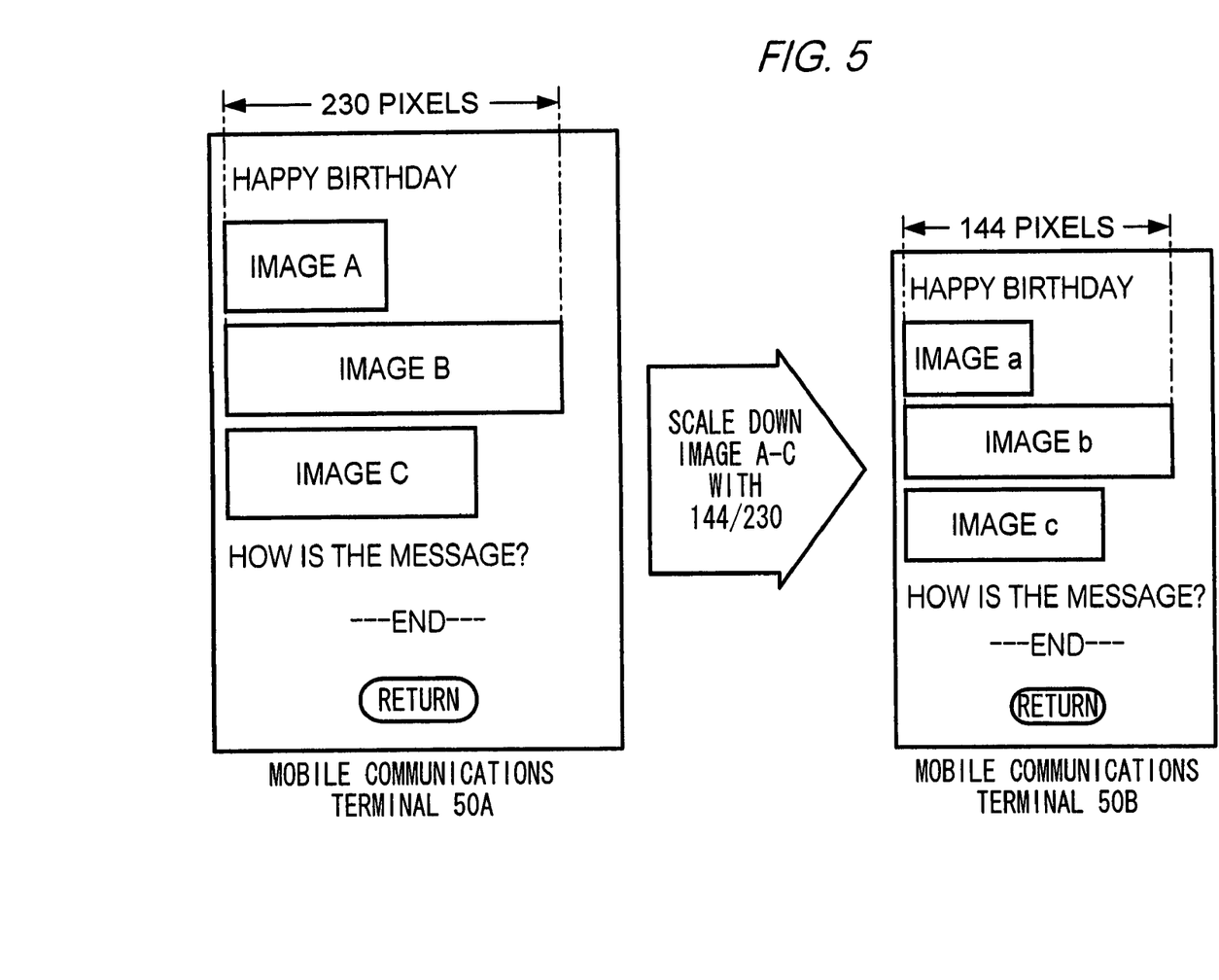
FIG. 5 is a diagram showing how data of an electronic mail is displayed on a display of a mobile communications terminal according to the first embodiment.

More detailed description will be given of the contraction process applied to the image data. FIG. 5 is a schematic diagram showing how mobile communications terminal 50B displays the laid out electronic mail data transmitted from mobile communications terminal 50A.

As display unit 52 of mobile communications terminal 50A is larger than that of mobile communications terminal 50B, the electronic mail data transmitted from mobile communications terminal 50A may contain image data having a horizontal width which is too large if it is to be displayed on display unit 52 of mobile communications terminal 50B. In an example shown in FIG. 5, the horizontal width of the image B is 230 pixels, so the image B cannot be accommodated in a display area of mobile communications terminal 50B having a horizontal width of only 144 pixels. In this case, mobile communications terminal 50B, having received electronic mail data, obtains a contraction scale for proportionally fitting the image B, which has the largest image size, to the display area of its own display unit 52 by computing the percentage of 144 pixels to 230 pixels (Step S140 of FIG. 4). Then control data of pixels of images A, B, and C are resampled to obtain contracted images with a ratio of 144/230. The contraction process is thus realized and the proportional size of images A-C is maintained.

In the above described embodiment, mobile communications terminal 50 is provided with an image adjustment application; and when such a terminal 50 displays a plurality of image data contained in a received electronic mail, it applies the identical contraction scale to all of the images, where the contraction scale is computed based on the horizontal width of the image having the largest horizontal width. Thus, even when receiving an electronic mail having data of an image having the horizontal width that cannot be accommodated by display unit 52, it is possible for the terminal 50 to display images in its display area while maintaining the proportion of size between different images. In other words, a problem with the conventional method is avoided where the proportion of the size between different images is compromised and the intention of a user of the transmitting terminal is not conveyed.

Display screens can have different aspect ratios, which can be different between a transmitter terminal and a receiver terminal. For example, a transmitter terminal can have a larger vertical width than the receiver terminal so that, a lower portion of an image may extend off screen vertically even when the horizontal width of image data attached to the electronic mail has been scaled down so as to fit to the horizontal width of a display area of the receiver terminal. In this case, the screen of the receiver terminal may easily be scrolled vertically, whereby viewing of images that have been proportionally sized to fit the horizontal width of the screen is enabled.

Second Embodiment

Next, description will be given of a second embodiment of the present invention. In the above first embodiment, the proportional size of only image data contained in electronic mail data is contracted according to one contraction scale.

In the present embodiment, the contraction process is performed not only for image data but also for characters, so that characters having a font size that is in proportion with the contracted image data are displayed.

The hardware configuration of the present embodiment is the same as that of the first embodiment except that there is stored in memory 54*b* of a mobile communications terminal 50 a table wherein an image contraction scale and a font size are associated with each other. Specifically, the details of the table are as follows: where the contraction scale of the electronic mail data is equal to or larger than 90%, the font is set as a standard size; where the contraction scale is equal to or larger than 75% and smaller than 90%, the font is set as a medium size that is smaller than the standard size; and where the contraction scale is smaller than 75%, the font is set as a small size that is smaller than the medium sized font.

Next, description will be given of an operation of the present embodiment.

In the present embodiment, after a contraction scale is computed in Step S140, control unit 55 obtains a font size corresponding to the contraction scale from memory 54*b*. The text is laid out according to the obtained font size with image data inserted in predetermined locations of the text, whereby the text and image are shown together on display unit 52.

According to the present embodiment, not only the size of images contained in an electronic mail is contracted while the proportional size between images is maintained, but also the text is contracted to a suitable size corresponding to the contraction scale of the images. Thus, a problem is avoided of the text of an electronic mail appearing out of proportion with the contracted images.

Third Embodiment

In the above first embodiment, when mobile communications terminal 50B receives electronic mail data containing data of one or a plurality of images wider than a display area of its display unit, it displays the received image data after performing the contraction process using an identical contraction scale to enable all images to fit its own display area. In the third embodiment, description will be given of a case where a user of mobile communications terminal 50A, having viewed the contracted images, wishes to transfer an electronic mail having the displayed images to another mobile communications terminal 50C, either as it is or after making changes. In the third embodiment, the same reference numerals will be used for the portions that are the same as the first embodiment, and the detailed description thereof will be omitted.

Figure 7:
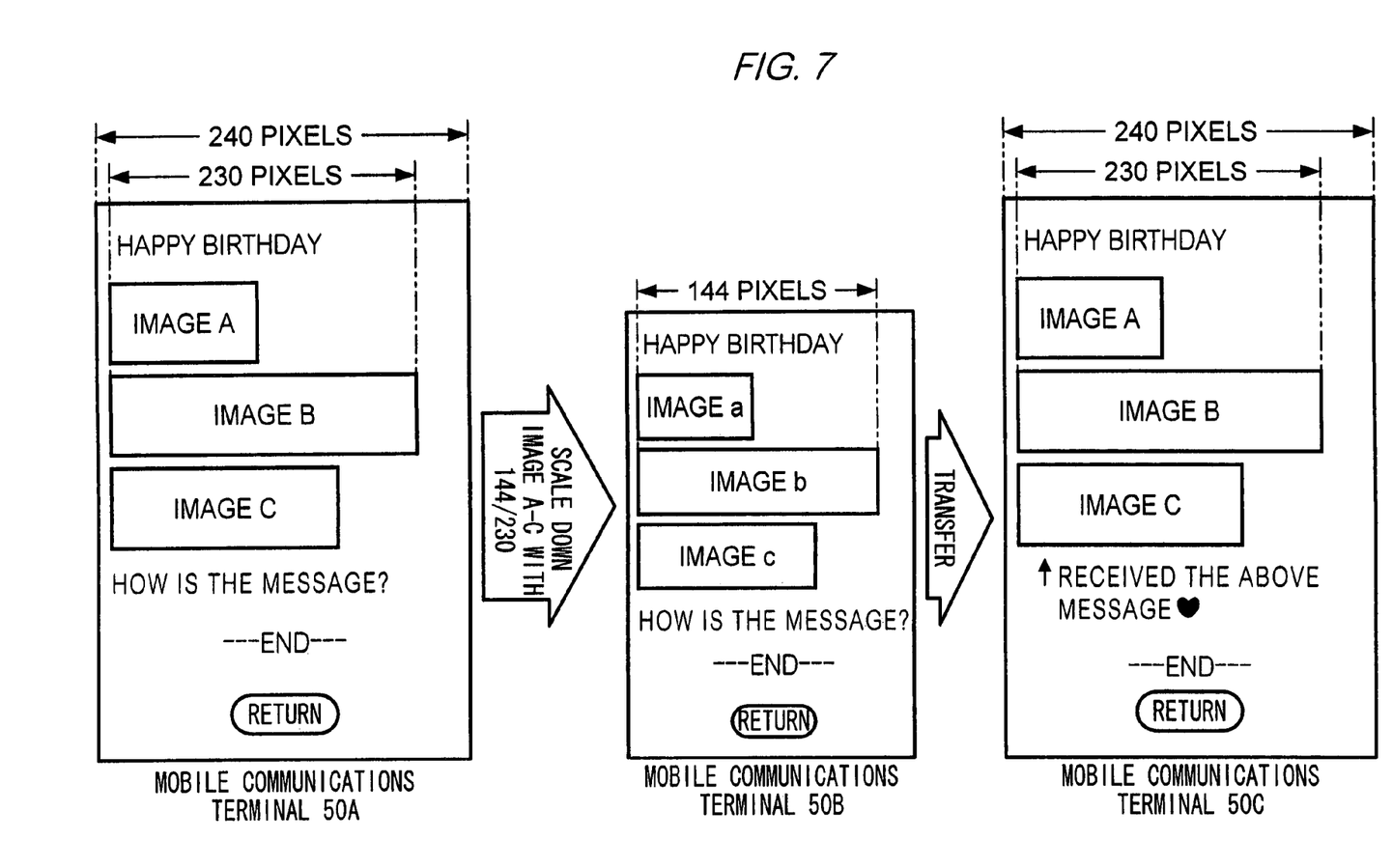
FIG. 7 is a diagram showing how data of an electronic mail is displayed on a display of a mobile communications terminal according to the third embodiment.

In the present embodiment, mobile communications terminal 50B has a mail editing function for editing the displayed text data. Specifically, the terminal 50B has a function for entering new text or making changes to the text. A configuration of mobile communications terminal 50C is the same as that of mobile communications terminal 50B. In the present example, it is assumed that the display area width of a display unit 52 of mobile communications terminal 50C is 240 pixels as shown in FIG. 7, but the present embodiment is not limited thereto. The horizontal width of the display area may be any other value as long as it represents a horizontal width which a display unit of a receiver terminal is likely to have.

Figure 6:
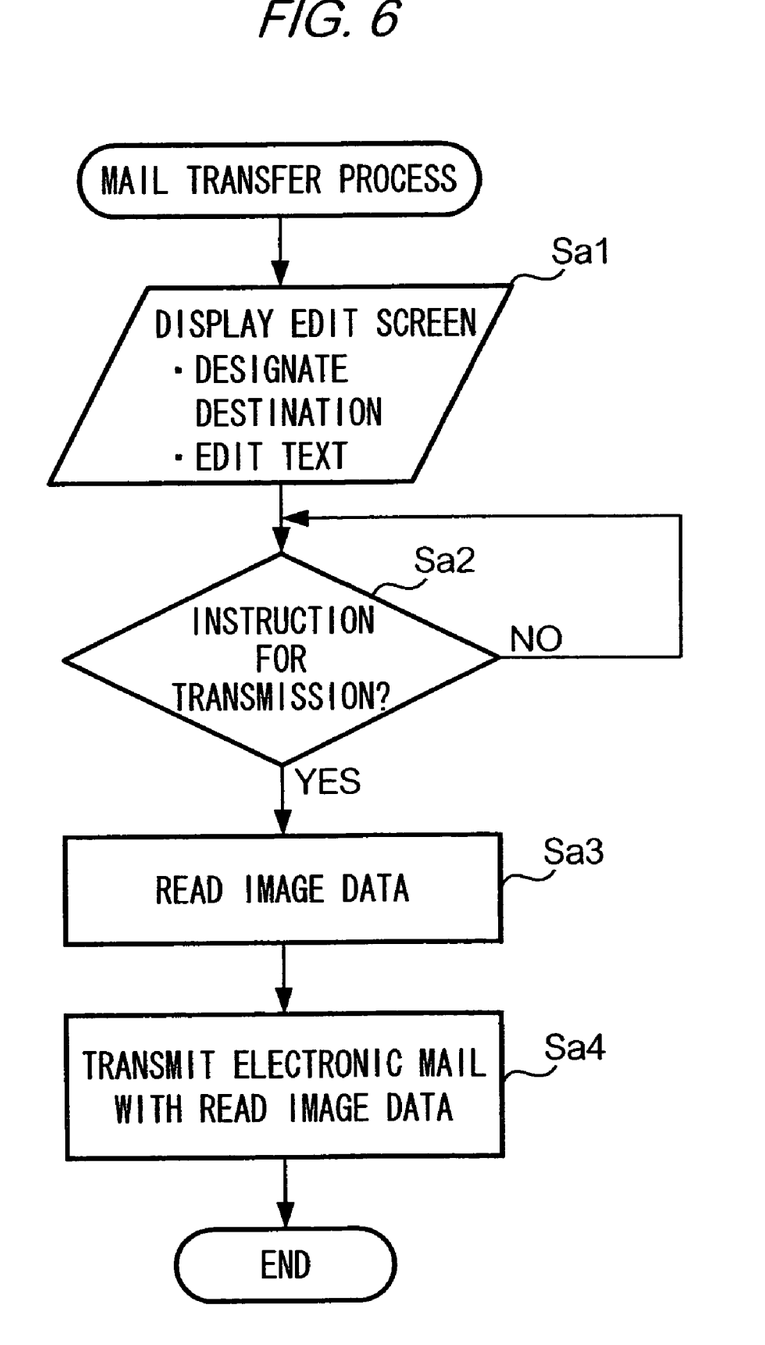
FIG. 6 is a flowchart showing an operation of a third embodiment.

FIG. 6 is a flowchart showing a mail transfer process according to the present embodiment; and FIG. 7 is a diagram showing how a mobile communications terminal of the present embodiment displays electronic mail data.

As in the first embodiment, when control unit 55 of mobile communications terminal 50B receives an electronic mail from mobile communications terminal 50A, it first stores the original text and image data of the electronic mail in memory 54*b*. Then, the image contraction process of Steps S110 to S170 in FIG. 4 is performed so as to make the images intended by a user of the terminal 50A, after which the image data of the contracted images are also stored in memory and displayed on display unit 52 (see FIG. 7). The text data remains constant and is not altered by the contraction process.

When a user of mobile communications terminal 50B operates an operation unit 51 to input an instruction for transferring the displayed electronic mail to mobile communications terminal 50C owned by another user, control unit 55 of mobile communications terminal 50B executes a mail transfer process shown in FIG. 6.

In the mail transfer process, control unit 55 first displays an edit screen for prompting the user to designate a destination, and to edit a title and text of the electronic mail (Step Sa1). In this step, the user inputs a mail address of a terminal to which the mail is to be transferred, and edits the title and/or the text where necessary. Control unit 55 then determines whether an instruction for the transmission of the mail has been entered (Step Sa2). Where no instruction for transmission is entered (Step Sa2: No), control unit 55 waits for the input of such an instruction unless the mail transfer process is cancelled by the user.

In this example, the user pushes down an enter button (not shown) of operation unit 51 requesting transmission of the electronic mail after designating a mail address of mobile communications terminal 50C as a destination and editing the text, and it is determined YES in Step Sa2. The routine then proceeds to Step Sa3.

In Step Sa3, control unit 55 reads the original image data stored in memory. As used herein the term "image data" shall be broadly construed to mean image data containing attribute data defining the horizontal width and the vertical width of each of the images A to C.

Subsequently, control unit 55 transmits the edited text data with the original image data read from memory 54*b* in Step Sa3 (Step Sa4), and the mail transfer process is completed.

When the thus transferred electronic mail is received at mobile communications terminal 50C, a control unit 55 of mobile communications terminal 50C stores data of the received electronic mail in memory 54*b*. Then, when the mobile communications terminal 50C is instructed by a user to display the electronic mail, the mobile communications terminal reads the text data first and then the original image data from memory 54*b*, to thereby display the electronic mail on display unit 52.

As shown in FIG. 7, mobile communications terminal 50C has a display area that is large enough to display an image having the largest size (image B of FIG. 5). Therefore, all the images are shown in the size that was created by the original sender, in mobile communications terminal 50A, without applying a contraction process to the images.

Thus, in displaying electronic mail data stored in memory 54b, mobile communications terminal 50B supplies image data to display unit 52 after performing a contraction process of the image data so as to fit its own display area, but the electronic mail data stored in memory 54b remains unchanged. When the transfer of the electronic mail is requested, the electronic mail data stored in memory 54b is transferred to another mobile communications terminal 50C. Therefore, where mobile communications terminal 50C has a display area that is the same size as that of a mobile communications terminal of the originator of the mail, i.e., mobile communications terminal 50A, the electronic mail showing the images in their original size is displayed at mobile communications terminal 50C.

Thus, according to the present embodiment, even when electronic mail data created at a terminal having a large display size is transferred to another communications terminal via still another terminal having a limited display area, the final destination terminal is able to display images having a size created at the originating terminal by making the best use of its own display area, without being affected by any image contraction process performed at an intermediate terminal. Accordingly, because the original image data is transmitted each time, there is no degradation in the quality of the image data and therefore in the images themselves from terminal-to-terminal.

Fourth Embodiment

In this embodiment, the original mail data is transferred from mobile communications terminal 50A to mobile communications terminal 50B and stored in memory 54b. The contraction process is performed at mobile communications terminal 50B and electronic data obtained as a result of the image contraction process is stored in memory by overwriting the original image data. When the mail is viewed subsequently, mobile communications terminal 50B immediately displays the image data having a size which fits its own display area. When the image data obtained by performing the contraction process is transferred to mobile communications terminal 50C, the contracted image data is displayed as long as the transferred images are not wider than a display area of the receiving terminal.

Figure 8:
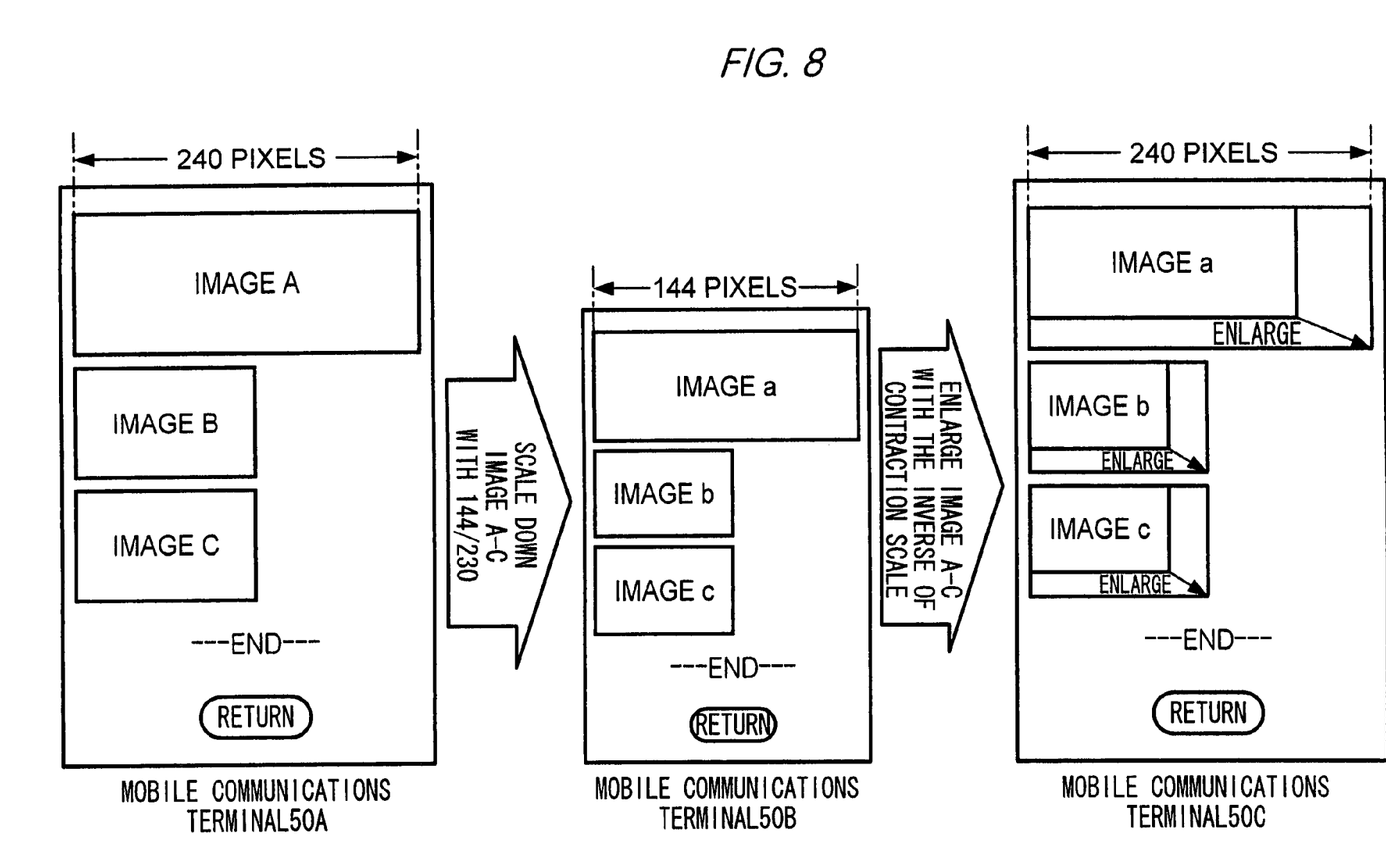
FIG. 8 is a diagram showing how data of an electronic mail is displayed on a display of a mobile communications terminal according to a fourth embodiment.

In this case, an effect the same as that of the above third embodiment can be obtained if the original data size is restored after transfer by dividing the image data using the contraction scale which was used when the images were contracted. Specifically, in the example shown in FIG. 8, mobile communications terminal 50B transfers, to mobile communications terminal 50C, the images a, b, and c that have been contracted after receiving the images from mobile communications terminal 50A. In this case, mobile communications terminal 50C reads the images a, b, and c from memory 54b, and enlarges each of the read images a, b, and c using the inverse of the contraction scale. Thus enlarged image data is generated as a part of the electronic data with the text data to mobile communications terminal 50C. As a result, at the receiver mobile communications terminal 50C, enlarged images are displayed as shown in the right side of FIG. 8.

In another preferred embodiment, it is also possible to convert the contracted image data to the original data at mobile communications terminal 50B prior to transfer to mobile communications terminal 50C.

It is to be noted that, in either of the above cases of transferring images after enlarging the images at mobile communications terminal 50B or causing the receiving mobile communications terminal 50C to enlarge the contracted images, the contraction scale used by mobile communications terminal 50B for contracting the image data may be stored in correlation with the electronic mail data stored in memory 54b or stored in a storage area of the attached file data describing portion, whereby the enlargement process of the images is enabled.

An advantage of the fourth embodiment of the present invention is that the operations required to convert the image data between mobile communications terminals 50B and 50C can be shared by each terminal thereby reducing the amount of time required to properly display the mail message at mobile communications terminal 50C.

Fifth Embodiment

In the previous embodiments discussed herein above proportional resizing of image and text data was performed by one of the mobile communications terminals. In another embodiment of the present invention, shown in FIG. 9, a server 60 is provided that includes data stored in memory therein that pertains to characteristic information corresponding to a plurality of different mobile communications terminals. The data can be stored in the memory according to the manufacturer and model of a particular receiving mobile communications terminal or in accordance with subscriber information, such as, but not limited to, telephone numbers and e-mail addresses. The subscriber information uniquely identifies a receiving mobile communications terminal and in particular the manufacturer and model of the mobile communications terminal. In all cases the data stored in the server memory must ultimately identify the size of a display associated with the particular mobile communications terminal.

Figure 9:
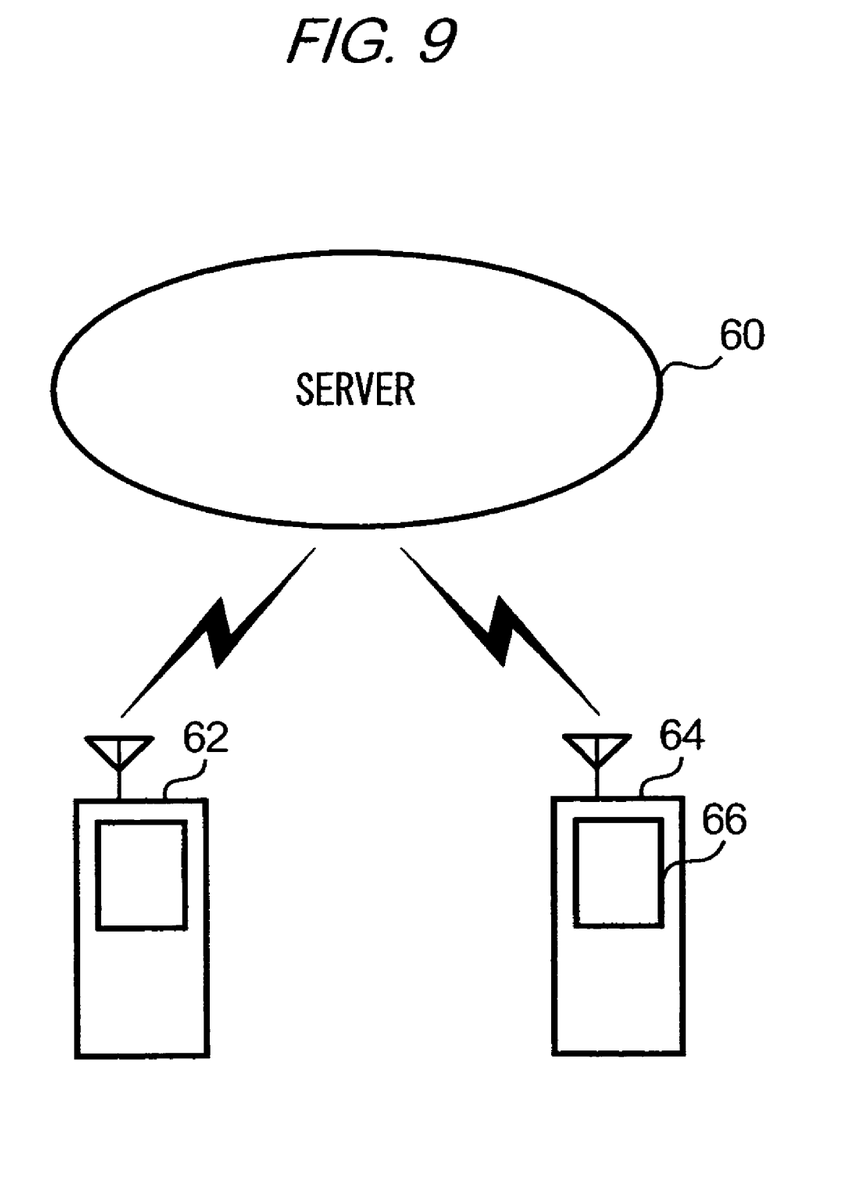
FIG. 9 is a diagram showing an example of a configuration of a communication system according to a fifth embodiment.

During operation, data is transmitted from a transmitting mobile communications terminal 62 by conventional methods, to a receiving mobile communications terminal 64. Before arriving at the receiving mobile communications terminal, the transmitted data is first received and processed by a server 60. The transmitted data contains information corresponding to at least two images that the user transmitting the data wishes the user receiving the data to be able to view in their proper proportions on the display of the receiving mobile communications terminal 64.

The transmitted data is accepted by a receiver forming part of the server 60. Based on the information contained within the transmitted data, an analyzing module or mechanism also forming part of the server, accesses data stored in server memory to identify the receiving mobile communications terminal 64 and the size of the display 66 associated therewith. The analyzing mechanism also includes a comparing module or mechanism for reviewing the transmitted data and determining whether the size of the images embodied therein comport with the display size defined by the display of the receiving mobile communications terminal 64. If necessary, the transmitted data is modified to proportionally resize the at least two images for viewing on the display 66 defined by the receiving mobile communications terminal 64. The server 60 then, via a transmitter (not shown) forming part of the server, forwards the modified transmitted data to the receiving mobile communications terminal 64 for viewing on the display 66 defined thereby.

Since the data sent from the transmitting mobile communications terminal 62 can be sufficiently voluminous so as to require too much time for the server 60 to analyze the data, this embodiment also contemplates that the transmitting mobile communications terminal further transmits identifying tags or bits of data that designate the largest horizontal width defined by the at least two images embodied in the transmitted data. This tag is received by the server 60 which compares the image information with the size of the display 66 of the receiving mobile communications terminal 64 to determine if proportional resizing is necessary. If it is determined that resizing is required, the server 60 selects and applies a scaling factor, stored in the sever memory that, once applied to the image data will modify the transmitted data to proportionally resize the images contained therein so as to be viewable in the appropriate scale on the display 66 of the receiving mobile communications terminal 64.

In the above embodiments, mobile communications terminal 50 is a portable phone provided with mail client functionality, but may be a PHS (Personal Handyphone System®) unit, a PDA (Personal Digital Assistance) unit, or a mobile PC, so long as the device has mail client functionality. Accordingly, the mobile communications terminal can have one or more of a telephone function, a web browsing function, a data communication function, and a vertical scrolling function.

Further, mobile communications terminal 50 of the present invention is not limited to a terminal served by mobile communications network 40 as described in the above embodiments, but may be a terminal served by another communications network if the terminal is provided with the image adjustment application of the present invention.

Also, in the above embodiments, the image adjustment application is stored in advance in memory 54b. However, it is also possible to configure the image adjustment application in such a way that the application program is stored in a server device in a network by describing the program using Java® programming language. In such a configuration, the image adjustment application may be downloaded to a mobile communications terminal 50 upon request there from, so that the application is executed on a Java virtual machine provided in the mobile communications terminal 50.

Further, in the second embodiment, three categories of the font size are provided, but it is possible to provide more detailed categories of the font size between which the font size is switched according to the change of the contraction scale applied to image data.

In the above embodiments, image data generated by a mobile communications terminal 50 having a larger display area size is contracted at a mobile communications terminal 50 having a smaller display area size. It is also possible to display images after enlarging image data that has been generated at a mobile communications terminal 50 having a smaller display area. In addition, the terms "display" should be broadly construed herein to include electronic displays, such as, but not limited to LCD displays, as well as optical displays such as, but not limited to projected images.

In the above embodiments, image data is described in GIF format, but may be described in a different format such as JPEG (Joint Photographic Experts Group).

What is claimed is:

1. A mobile communications terminal comprising:
    a receiver for accepting transmitted data containing information corresponding to at least two images;
    a display for viewing the transmitted data, said display defining a horizontal width and a vertical width;
    an adjustment mechanism for resizing said at least two images to create resized image data based on a single computed image contraction scale determined from a larger of said at least two images so that a proportion of size between said at least two images is maintained and a maximum horizontal width defined thereby is substantially equal to or less than said horizontal width defined by said display; and
    a transmitter for sending data including at least two images, wherein said transmitter includes a mechanism for transmitting data corresponding to said resized image data and said single computed image contraction scale, which can be used for restoring said resized at least two images at another communications terminal.

2. A mobile communications terminal defined by claim 1 wherein said mobile communications terminal includes a telephone function.

3. A mobile communications terminal as defined by claim 1 further including a web browsing function.

4. A mobile communications terminal as defined by claim 1 further including a data communication function.

5. A mobile communications terminal as defined by claim 1 wherein said display includes an electronic display.

6. A mobile communications terminal as defined by claim 5 wherein said electronic display is an LCD.

7. A mobile communications terminal as defined by claim 1 wherein said display is an optical display.

8. A mobile communications terminal as defined by claim 1 further including a scrolling mechanism for moving at least a portion of said at least two images in a direction along said vertical width of said display.

9. A mobile communications terminal as defined by claim 1 further comprising memory for storing said transmitted data.

10. A mobile communications terminal as defined by claim 1 wherein said adjustment mechanism further includes a mechanism for proportionally adjusting a size defined by text contained in said transmitted data.

11. A mobile communications terminal comprising:
    a receiver for accepting transmitted data containing information corresponding to at least two images;
    a display for viewing said transmitted data, said display defining a horizontal width and a vertical width; and
    a transmitter for sending data including at least two images, wherein said mobile communications terminal is programmed to resize said at least two images to create resized image data based on a single computed image contraction scale determined from a larger of said at least two images so that a proportion of size between said at least two images is maintained so that a maximum horizontal width defined thereby is substantially equal to or less than said horizontal width defined by said display, and further wherein said transmitter includes a mechanism for transmitting data corresponding to said resized image data and said image contraction scale, which can be used for restoring said resized at least two images at another communications terminal.

12. A mobile communications terminal comprising:
    a receiver for accepting transmitted data containing information corresponding to at least two images;
    a display for viewing said transmitted data, said display defining a horizontal width and a vertical width;
    an adjustment module for interpreting said transmitted data and for resizing said at least two images to create resized image data based on a single computed image contraction scale determined from a larger of said at least two images so that a proportion of size between said at least two images is maintained; and
    a transmitter for sending data including at least two images, wherein said transmitter includes a mechanism for transmitting data corresponding to said resized image data and said single computed image contraction scale, which can be used for restoring said resized at least two images at another communications terminal.

13. A mobile communications terminal comprising:
a receiver for accepting transmitted data containing information corresponding to at least two images;
a display for viewing said transmitted data, said display defining a horizontal width and a vertical width;
an adjustment module for determining and applying a single computed image contraction scale to said at least two images to resize said images prior to viewing on said display to create resized image data so that a proportion of size between said at least two images is maintained; and
a transmitter for sending data including at least two images, wherein said transmitter includes a mechanism for transmitting data corresponding to said resized image data and said single computed image contraction scale, which can be used for restoring said resized at least two images at another communications terminal.

14. A mobile communications terminal comprising:
means for receiving transmitted data containing information corresponding to at least two images;
display means for viewing said transmitted data; said display means defining a horizontal width and a vertical width;
means for resizing said at least two images to create resized image data based on a single computed image contraction scale determined from a larger of said at least two images so that a proportion of size between said at least two images is maintained and so that a maximum horizontal width defined thereby is substantially equal to or less than said horizontal width defined by said display means; and
means for sending data including at least two images, wherein said means for sending data includes a mechanism for transmitting data corresponding to said resized image data and said single computed image contraction scale, which can be used for restoring said resized at least two images at another communications terminal.

15. A method for manipulating data transmitted to or from a mobile communications terminal, said method comprising the steps of:
providing a mobile communications terminal that includes; a receiver for accepting transmitted data containing information corresponding to at least two images, memory, a display for viewing said transmitted data, an adjustment mechanism for at least resizing said at least two images to create resized image data based on a single computed image contraction scale determined from a larger of said at least two images so that a proportion of size between said at least two images is maintained, and a transmitter for sending data including at least two images, wherein said transmitter includes a mechanism for transmitting data corresponding to said resized image data and said single computed image contraction scale;
receiving said transmitted data;
storing said transmitted data into said memory;
analyzing said transmitted data to determine if at least one of said at least two images need resizing;
if resizing is necessary, causing said adjustment mechanism to resize said at least two images for viewing on said display;
sending said transmitted data stored in said memory and said single computed image contraction scale to another mobile communications terminal, and using said single computed image contraction scale for restoring said resized at least two images at another communications terminal.

16. A method as defined by claim 15 wherein:
said step of analyzing said transmitted data further includes determining a maximum horizontal width defined by said at least two images and comparing said maximum horizontal width to a horizontal width defined by said display; and
said step of causing said adjustment mechanism to resize said at least two images for viewing on said display further includes resizing said at least two images so that said maximum horizontal width defined by said at least two images is substantially equal to or less than said horizontal width defined by said display.

17. A method for manipulating data transmitted to or from a mobile communications terminal, said method comprising the steps of:
providing a mobile communications terminal that includes; a receiver for accepting transmitted data containing information corresponding to at least two images, memory, a display for viewing said transmitted data, an adjustment mechanism for at least resizing said at least two images to create resized image data based on a single computed image contraction scale determined from a larger of said at least two images so that a proportion of size between said at least two images is maintained, and a transmitter for sending data including at least two images, wherein said transmitter includes a mechanism for transmitting data corresponding to said resized image data and said single computed image contraction scale;
receiving said transmitted data;
storing said transmitted data into said memory;
analyzing said transmitted data to determine if at least one of said at least two images need resizing;
if resizing is necessary, causing said adjustment mechanism to modify said transmitted data to determine said single computed image contraction scale and to resize said at least two images in accordance with said computed image contraction scale for viewing on said display;
sending said modified transmitted data including said single computed image contraction scale to another mobile communications terminal; and
using said single computed image contraction scale for restoring said resized at least two images at said another communications terminal.

18. A method as defined by claim 17 wherein prior to said step of sending said modified transmitted data, said method includes the further step of storing said modified transmitted data in said memory.

19. A method as defined by claim 17 wherein prior to said step of sending said modified transmitted data; said method includes the further step of overwriting said transmitted data stored in said memory with said modified transmitted data.

20. A method as defined by claim 17 wherein:
said transmitted data is sent from a first mobile communications terminal having a first display size;
said step of receiving said transmitted data includes receiving said transmitted data by a second mobile communications terminal, said second mobile communications terminal having a second display size different from said first display size;
said another mobile communications terminal being a third mobile communications terminal having a display size at least as large as said first display size; and wherein said method includes the further steps of;

receiving, at said third mobile communications terminal, said modified transmitted data; and applying, at said third mobile communications terminal, an inverse of said computed image contraction scale to said modified transmitted data thereby causing said at least two images to be resized to their original size as sent by said first mobile communications terminal.

* * * * *